United States Patent
Balboni et al.

(10) Patent No.: US 8,235,702 B2
(45) Date of Patent: Aug. 7, 2012

(54) APPARATUSES AND METHODS FOR PROCESSING DOSES OF FLOWABLE MATERIAL

(75) Inventors: Alessandro Balboni, Granarolo dell'Emilia (IT); Fiorenzo Parrinello, Medicina (IT)

(73) Assignee: Sacmi Cooperative Meccanici Imola Societa' Cooperativa, Imola (BO) (IT)

( * ) Notice: Subject to any disclaimer, the term of this patent is extended or adjusted under 35 U.S.C. 154(b) by 312 days.

(21) Appl. No.: 11/991,482

(22) PCT Filed: Aug. 24, 2006

(86) PCT No.: PCT/EP2006/065647
§ 371 (c)(1),
(2), (4) Date: Jun. 11, 2008

(87) PCT Pub. No.: WO2007/028723
PCT Pub. Date: Mar. 15, 2007

(65) Prior Publication Data
US 2010/0289171 A1   Nov. 18, 2010

(30) Foreign Application Priority Data
Sep. 7, 2005   (IT) .............................. MO2005A0223

(51) Int. Cl.
*B29C 43/08* (2006.01)
(52) U.S. Cl. ........ 425/345; 425/344; 425/297; 425/261; 425/348 R; 425/809

(58) Field of Classification Search .................. 425/258, 425/259, 297, 296, 307, 311, 312, 313, 344, 425/345, 348 R, 804, 809, 813
See application file for complete search history.

(56) References Cited

U.S. PATENT DOCUMENTS

| | | | |
|---|---|---|---|
| 3,414,938 A | | 12/1968 | Enzo |
| 3,782,329 A | * | 1/1974 | Everett .......................... 118/215 |
| 3,825,044 A | * | 7/1974 | Lidikay et al. ................ 141/187 |
| 3,867,081 A | | 2/1975 | Everett |
| 3,955,605 A | * | 5/1976 | Zupan ............................... 141/1 |
| 4,080,136 A | * | 3/1978 | Peller ............................. 425/295 |
| 4,251,198 A | | 2/1981 | Altenburg |
| 4,277,431 A | | 7/1981 | Peller |
| 4,640,673 A | * | 2/1987 | Takeda et al. ................. 425/297 |
| 5,456,587 A | * | 10/1995 | Ingram ........................... 425/168 |

(Continued)

FOREIGN PATENT DOCUMENTS

CH    443 647    9/1967

(Continued)

OTHER PUBLICATIONS

Japanese Office Action and English Translation issued in corresponding Japanese Application No. 2008-529592, mailed Aug. 16, 2011, 16 pages.

*Primary Examiner* — Joseph Del Sole
*Assistant Examiner* — Ryan Ochylski
(74) *Attorney, Agent, or Firm* — Nixon & Vanderhye P.C.

(57) ABSTRACT

An apparatus comprises an extruding device having a dispensing opening for extruding a flowable material along an exit direction through the dispensing opening, and a cutting arrangement for separating a dose from the flowable material, the cutting arrangement being movable with a motion component that is parallel to the exit direction.

42 Claims, 9 Drawing Sheets

U.S. PATENT DOCUMENTS

| | | | |
|---|---|---|---|
| 2004/0208947 A1* | 10/2004 | Parrinello | 425/348 R |
| 2004/0212128 A1* | 10/2004 | Balboni et al. | 264/400 |
| 2005/0220920 A1* | 10/2005 | Fridley | 425/313 |
| 2006/0034960 A1* | 2/2006 | Pucci et al. | 425/110 |
| 2008/0268274 A1* | 10/2008 | Parrinello et al. | 428/542.8 |

FOREIGN PATENT DOCUMENTS

| | | |
|---|---|---|
| DE | 196 42 389 | 4/1997 |
| EP | 0 240 017 | 10/1987 |
| EP | 1 101 586 | 5/2001 |
| EP | 1 101 587 | 5/2001 |
| GB | 874 084 | 8/1961 |
| GB | 2 178 359 | 2/1987 |
| JP | 2004-276371 | 10/2004 |
| JP | 2006-513882 | 4/2006 |
| WO | 2004/039553 | 5/2004 |
| WO | WO 2004039553 A1 * | 5/2004 |
| WO | WO 2004067251 A1 * | 8/2004 |
| WO | 2005/039853 | 5/2005 |
| WO | WO 2005102641 A1 * | 11/2005 |
| WO | WO 2005102642 A1 * | 11/2005 |

* cited by examiner

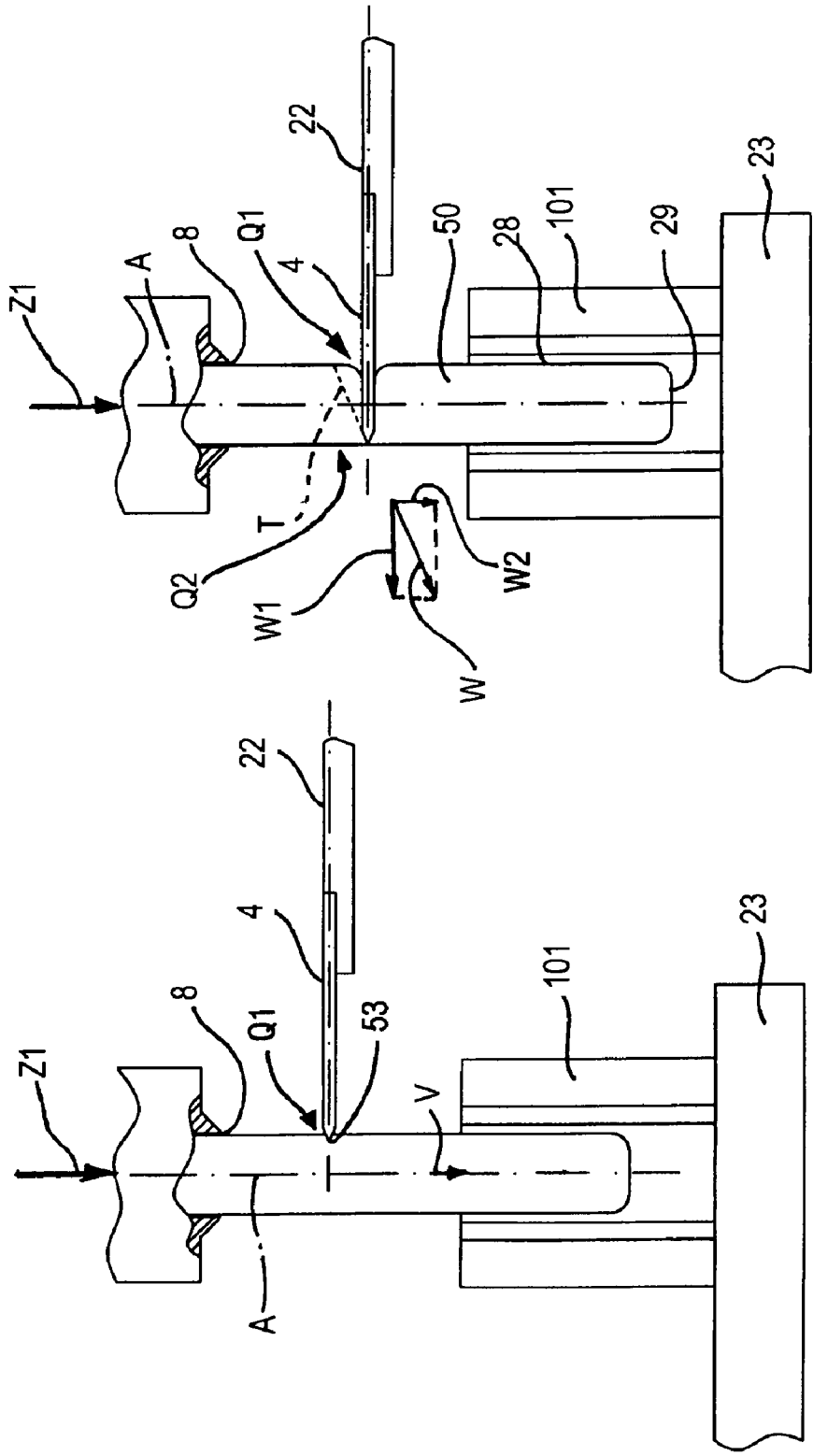

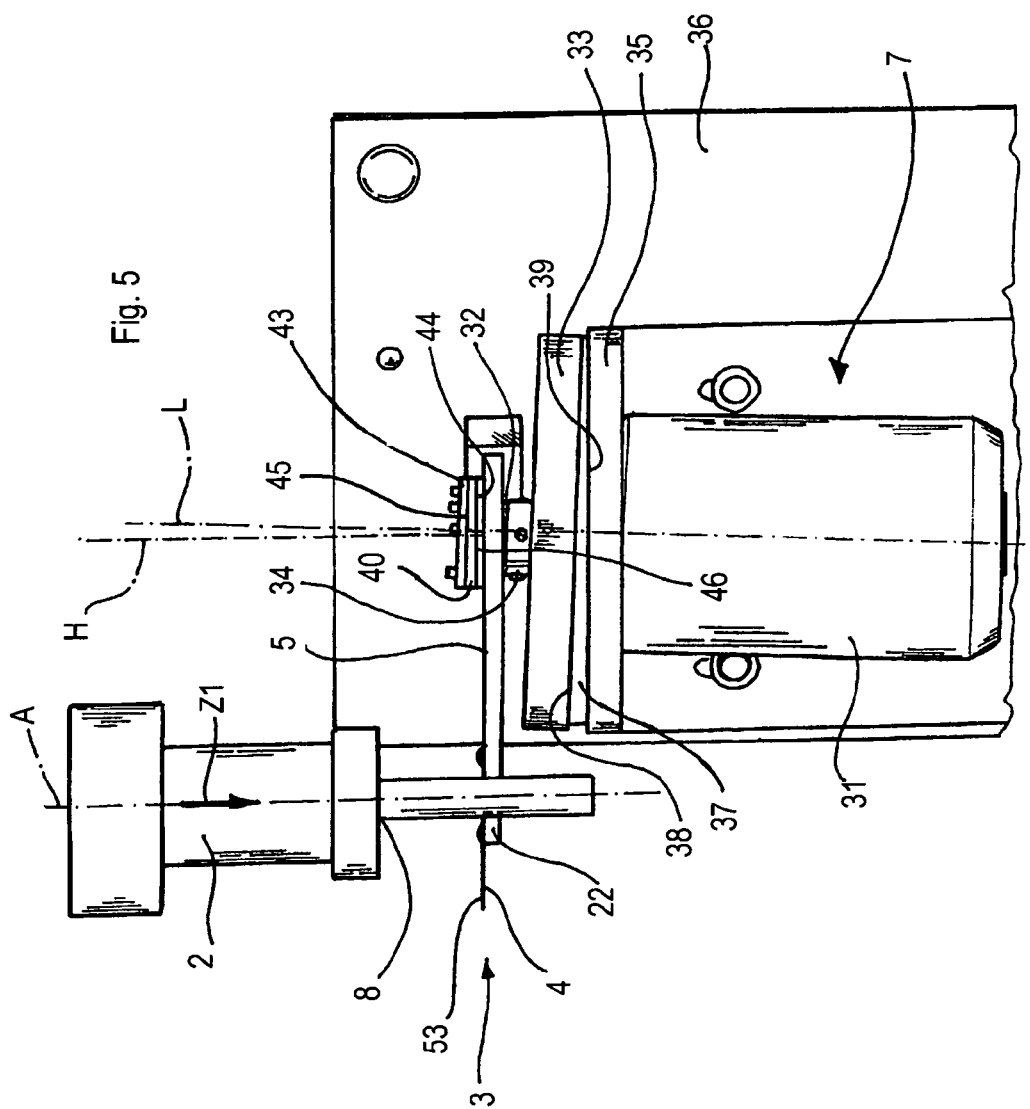

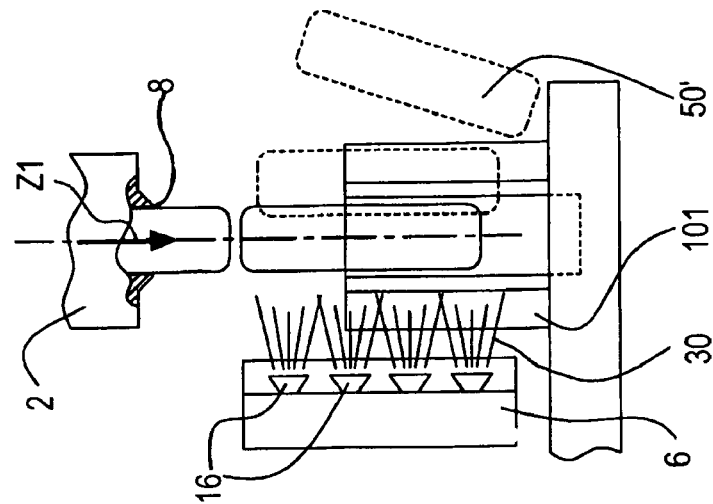
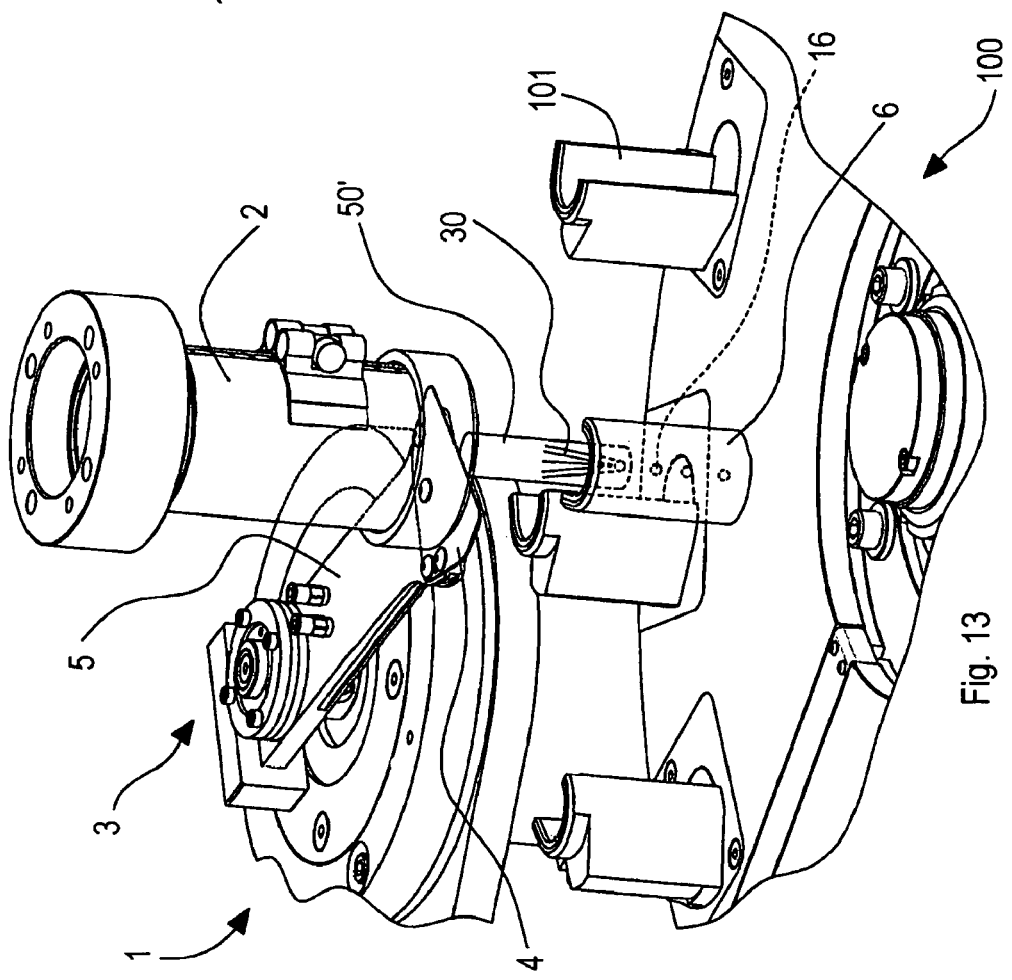

APPARATUSES AND METHODS FOR PROCESSING DOSES OF FLOWABLE MATERIAL

BACKGROUND

This application is the U.S. national phase of International Application No. PCT/EP2006/065647 filed 24 Aug. 2006 which designated the U.S. and claims priority to Italian Patent Application No. MO2005A000223 filed 7 Sep. 2005, the entire contents of each of which are hereby incorporated by reference.

The invention relates to apparatuses and methods for obtaining doses of flowable material, in particular doses of plastics, by cutting flowable material exiting from an extruding device. The doses thereby obtained can be processed by compression-moulding to obtain objects, particularly preforms for containers such as bottles.

The invention furthermore relates to apparatuses and methods for discarding possible defective doses so as to prevent such doses from being compression-moulded.

An apparatus is known for compression-moulding doses of plastics, comprising an extruding device from which the plastics exit along an exit direction. The apparatus furthermore comprises a cutting arrangement for separating the doses from the plastics exiting from the extruding device. The cutting arrangement comprises a plurality of knives rotatingly mobile around an axis parallel to the exit direction. Each knife is provided with a blade that extends on a plane perpendicular to the exit direction and keeps on this plane during rotation.

The plastics exit from the extruding device in a continuous manner. Thus whilst a knife is cutting a dose, the portion of plastics from which a part of the dose has already been separated continues to exit from the extruding device. This portion of plastics tends to stick to the blade, cooling prematurely, and exerts on the knife a thrust that may deform the blade, compromising cutting precision.

U.S. Pat. No. 4,640,673 discloses a particular type of apparatus for compression-moulding doses of plastics, which is provided with an extruding device and with a pair of knives rotatable around a rotation axis that cut the plastics exiting from the extruding device at preset intervals, so as to separate doses of plastics.

The knives rotate around the rotation axis at an angular speed that varies according to a preset law. In particular, the angular speed of the knives is relatively high when the knives separate the doses from the plastics exiting from the extruder. Immediately after cutting the doses, the angular speed of the knives is decreased. In order to move the knives at a variable angular speed, the apparatus disclosed in U.S. Pat. No. 4,640,673 comprises a pair of elliptical toothed wheels interposed between the knives and a motor that rotates the knives. The elliptical toothed wheels are designed in such a way as to ensure that the angular speed of the knives varies according to the desired law.

A drawback of the apparatus disclosed in U.S. Pat. No. 4,640,673 is that it is not very versatile. In fact, if it is desired to modify the law according to which the angular speed of the knives is varied, for example because the plastics to be extruded or the temperature thereof have been changed, or because it is desired to modify the length of the doses, it is necessary to dismantle the previously used pair of elliptical toothed wheels and replace the latter with a new pair of elliptical toothed wheels that drive the knives at the desired angular speed. This operation, in addition to requiring the arrest of the apparatus, is rather complicated and very time-consuming. A further drawback of known apparatuses is that the cutting arrangement has surfaces to which the plastics, that are in a pasty state when they exit from the dispensing device, tend to adhere during cutting. These adhesion phenomena in fact impair the performance of a precise and clean cut of the plastics and lead to the creation of defective doses. Furthermore, the adhesion of the plastics, that are at a high temperature, causes significant wear to the knives, which thus have to be changed frequently, with consequent increase in the running costs of the apparatus.

U.S. Pat. No. 4,277,431 discloses a method for providing a measured quantity of extrudate material to a receiving arrangement, in which the extrudate material is severed by a flexible and resilient blade which contacts a cutting surface of an extrusion outlet during each revolution and bends from a rest condition to a backwardly bent flexed condition.

WO 2004/039553 discloses a device for removing doses of plastic material from an extruder by means of at least one removal element movable with respect to the extruder and provided with a receptacle for housing a removed dose. The removal element comprises a severing element adapted to cut the plastic material along a severing edge advancing through the material.

GB 2178359 discloses an apparatus comprising an extruder and a rotary cutting tool for cutting a synthetic resin in the heat-melted state extruded from the extrusion opening.

EP 1101587 discloses an apparatus for delivering plural plastic pellets into cavities for compression moulding of the pellets into bottle closures or bottle closure liners. The apparatus is provided for delivering molten plastic pellets from a supply of molten plastic to a plurality of moulding blocks, each moulding block having a row of cavities.

EP 1101586 discloses a rotary cutter separating a molten plastic pellet from a nozzle and depositing the molten plastic pellet into a mould cavity. A stream of air is radially directed along a cutter blade of the rotary cutter to displace a molten plastic pellet from the cutter blade into the mould cavity.

CH 443647 discloses a dispensing device for distributing doses of a mouldable plastic material, in which a jet of pressurized air is used in order to release a dose into a moulding cavity.

SUMMARY

An object of the invention is to improve known apparatuses and methods for obtaining doses of flowable material, in particular by increasing precision and efficiency in cutting. Another object is to obtain an apparatus and a method that enable doses to be cut in a clean and precise manner from a flowable material exiting from an extruding device.

Still another object is to enable the speed of the cutting arrangement to be varied in a simple and rapid manner, even if the law has to be changed according to which the speed of the cutting arrangement varies.

A further object is to provide a method that enables doses of flowable material to be cut in a rapid manner.

Still another object is to reduce considerably the phenomena of adhesion of the flowable material to the cutting arrangement.

A further object is to improve the apparatuses for discarding possible defective doses of flowable material.

In a first aspect of the invention, an apparatus is provided comprising an extruding device having a dispensing opening for extruding a flowable material along an exit direction through said dispensing opening, and a cutting arrangement for separating a dose from said flowable material, wherein said cutting arrangement is movable with a motion component that is parallel to said exit direction.

In a second aspect of the invention, a method is provided comprising extruding a flowable material along an exit direction and separating a dose from said flowable material through a cutting arrangement, wherein said separating comprises moving said cutting arrangement with a motion component that is parallel to said exit direction.

Owing to these two aspects of the invention, it is possible to obtain an apparatus and a method that enable precise and clean cutting of the flowable material exiting from the dispensing device. The motion component along the exit direction causes the cutting arrangement to move away from the portion of flowable material exiting from the extruding device from which part of the dose has already been separated. This minimises the contact between the cutting arrangement and the flowable material. Risks of adhesion of the flowable material to the cutting arrangement are thus reduced. Furthermore, the flowable material is not prematurely cooled due to the contact with the cutting arrangement. Lastly, the pressure is reduced that is exerted on the cutting arrangement by the flowable material exiting from the extruding device, which makes deforming of the cutting arrangement more difficult.

In a third aspect of the invention, an apparatus is provided comprising an extruding device for extruding a flowable material, a cutting arrangement that is movable along a path for separating a dose from said flowable material, a driving arrangement for moving said cutting arrangement at a variable speed along said path, wherein said driving arrangement comprises electronic speed-varying devices.

Owing to the third aspect of the invention, it is possible to obtain a very versatile apparatus in which the law according to which the speed of the cutting arrangement varies can easily be modified. In particular, if it is necessary to modify the manner in which the speed of the cutting arrangement varies because, for example, the flowable material or the temperature thereof has been changed, or again the dimensions of the dose have been changed, it is sufficient to reprogram the electronic speed-varying devices. This may occur in a very rapid manner inasmuch as it is not necessary to replace mechanical parts of the apparatus, as was on the other hand required by prior-art apparatuses. Further, the electronic speed-varying devices enables the speed of the cutting arrangement to be kept constant within a desired interval, for example whilst the flowable material exiting from the extruding device is cut. This was not possible with the elliptical toothed wheels disclosed in U.S. Pat. No. 4,640,673.

In a fourth aspect of the invention, a method is provided comprising extruding a flowable material, moving a cutting arrangement along a path at a speed for separating a dose from said flowable material, modifying said speed along said path, wherein said modifying comprises making said speed different from greater than zero.

In an embodiment, said modifying comprises making this speed equal to zero. This means that the cutting arrangement is arrested along the path thereof.

In a further embodiment, said modifying comprises making said speed less than zero. This means that the cutting arrangement is moved backwards.

Owing to this aspect of the invention, it is possible to cut the doses of flowable material in a fast and clean manner. By stopping or moving backwards the cutting arrangement when the latter is not cutting the dose, it is possible to increase the duration of the interval in which the cutting arrangement does not interact with the flowable material. This enables the duration of the interval to be reduced in which the cutting arrangement interacts with the flowable material and consequently enables the speed with which the dose is cut to be increased. In this way, the cut is made in a clean manner, which reduces the risk of burrs forming, which burrs crystallise easily and can cause defects on the moulded object.

In a fifth aspect of the invention, an apparatus is provided comprising an extruding device for extruding a flowable material, a cutting arrangement for separating a dose from said flowable material, a cooling circuit for cooling said cutting arrangement, wherein said cutting arrangement comprises a first laminar part and a second laminar part between which there is defined a conduit of said cooling circuit.

Owing to the fifth aspect of the invention, it is possible to obtain an apparatus that enables phenomena of adhesion of the flowable material to the cutting arrangement to be reduced considerably when the dose is being separated from the flowable material exiting from the extruding device. The conduit identified between the first laminar part and the second laminar part in fact enables the temperature of the external surfaces of the cutting arrangement to be reduced effectively and consequently the adhesion of the flowable material to be reduced.

In a sixth aspect of the invention, an apparatus is provided comprising an extruding device for extruding a flowable material, a cutting arrangement for separating a dose from said flowable material, said cutting arrangement having an operating surface suitable for interacting with said flowable material, wherein said cutting arrangement is provided with a heating arrangement for heating said operating surface.

In a seventh aspect of the invention, a method is provided comprising extruding a flowable material, separating a dose from said flowable material through cutting arrangement, wherein it furthermore comprises heating said cutting arrangement.

Owing to the sixth and seventh aspect of the invention, it is possible to diminish adhesion of the flowable material to the cutting arrangement when the latter interacts with the flowable material to separate the doses.

In fact, by heating the cutting arrangement to a temperature slightly greater than the melting temperature of the flowable material to be cut, the flowable material is prevented from solidifying on contact with the cutting arrangement. This prevents solid residues of the flowable material from accumulating on the cutting arrangement. If on the other hand the cutting arrangement is heated to a temperature much greater than the melting temperature of the flowable material, possible residues of flowable material accumulated on the cutting arrangement are degraded or volatilized thermally, which enables the cutting arrangement to be kept substantially clean.

In an eighth aspect of the invention, an apparatus is provided comprising an extruding device having a dispensing opening for extruding a flowable material along an exit direction through said dispensing opening, a cutting arrangement for separating a dose from said flowable material and discarding devices for discarding a possible defective dose, wherein said discarding devices comprise diverting devices for diverting said possible defective dose from said exit direction.

In a ninth aspect of the invention, a method is provided comprising extruding a flowable material along an exit direction, separating a dose from said flowable material, discarding a possible defective dose, wherein said discarding comprises diverting said possible defective dose from said exit direction.

Owing to the eighth and ninth aspects of the invention, it is possible to obtain an apparatus in which possible defective doses are discarded, in a simple and efficient manner, immediately after being separated from the extruded flowable material. In this way the defective doses, particularly if they have dimensions such as not to be transportable, are prevented from reaching a transferring arrangement arranged downstream of the cutting arrangement, causing the apparatus to stop.

In a tenth aspect of the invention, an apparatus is provided comprising a transferring arrangement for transferring a dose of flowable material from a removing position to a delivering position, a receiving arrangement for receiving said dose in said delivering position, discarding devices for discarding a possible defective dose, wherein said discarding devices are arranged upstream of said delivering position.

In an eleventh aspect of the invention, a method is provided comprising transferring a dose of flowable material from a removing position to a delivering position, receiving said dose in said delivering position, discarding a possible defective dose, wherein said discarding occurs upstream of said delivering position.

Owing to the tenth and to the eleventh aspect of the invention, it is possible to optimise the position of the discarding devices along the transferring arrangement. Having positioned the discarding devices upstream of the delivering position prevents the transferring arrangement having to be purposely slowed to discard possible defective doses. In fact, upstream of the delivering position the transferring arrangement already moves per se with relatively low acceleration, in order not to stress the dose excessively that it is transferring. On the other hand, downstream of the delivering position, when the dose has already been released to the receiving arrangement, the transferring arrangement moves with greater acceleration to which the discarding devices pose no limit.

BRIEF DESCRIPTION OF DRAWINGS

The invention can be better understood and implemented with reference to the attached drawings, which illustrate some exemplifying and non-limiting embodiments thereof, in which:

FIG. 3 is a partially sectioned schematic front view showing a cutting arrangement for cutting a dose of plastics in an initial cutting step;

FIG. 4 is a view like the one in FIG. 3, showing the cutting arrangement in a final cutting step;

FIG. 5 is a schematic frontal view of a cutting arrangement according to an alternative embodiment;

FIG. 13 is a view like the one in FIG. 1 that shows an apparatus according to an alternative embodiment comprising diverting devices for discarding a possible defective dose exiting from an extruding device;

FIG. 14 is an enlarged view of the diverting devices in FIG. 13;

DETAILED DESCRIPTION

Figure 1:
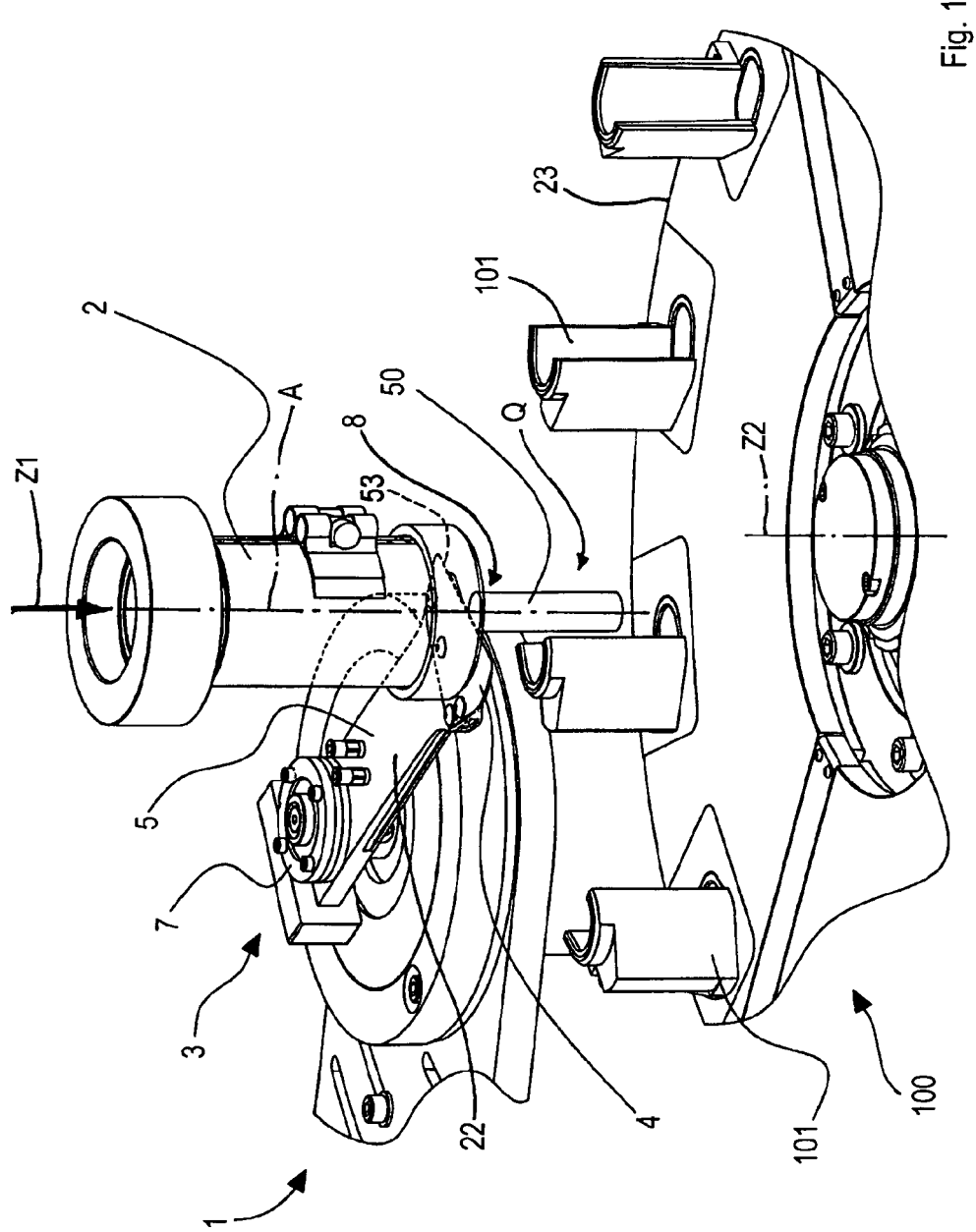
FIG. 1 is a perspective view of a portion of an apparatus for compression-moulding of doses of plastics.
Figure 2:
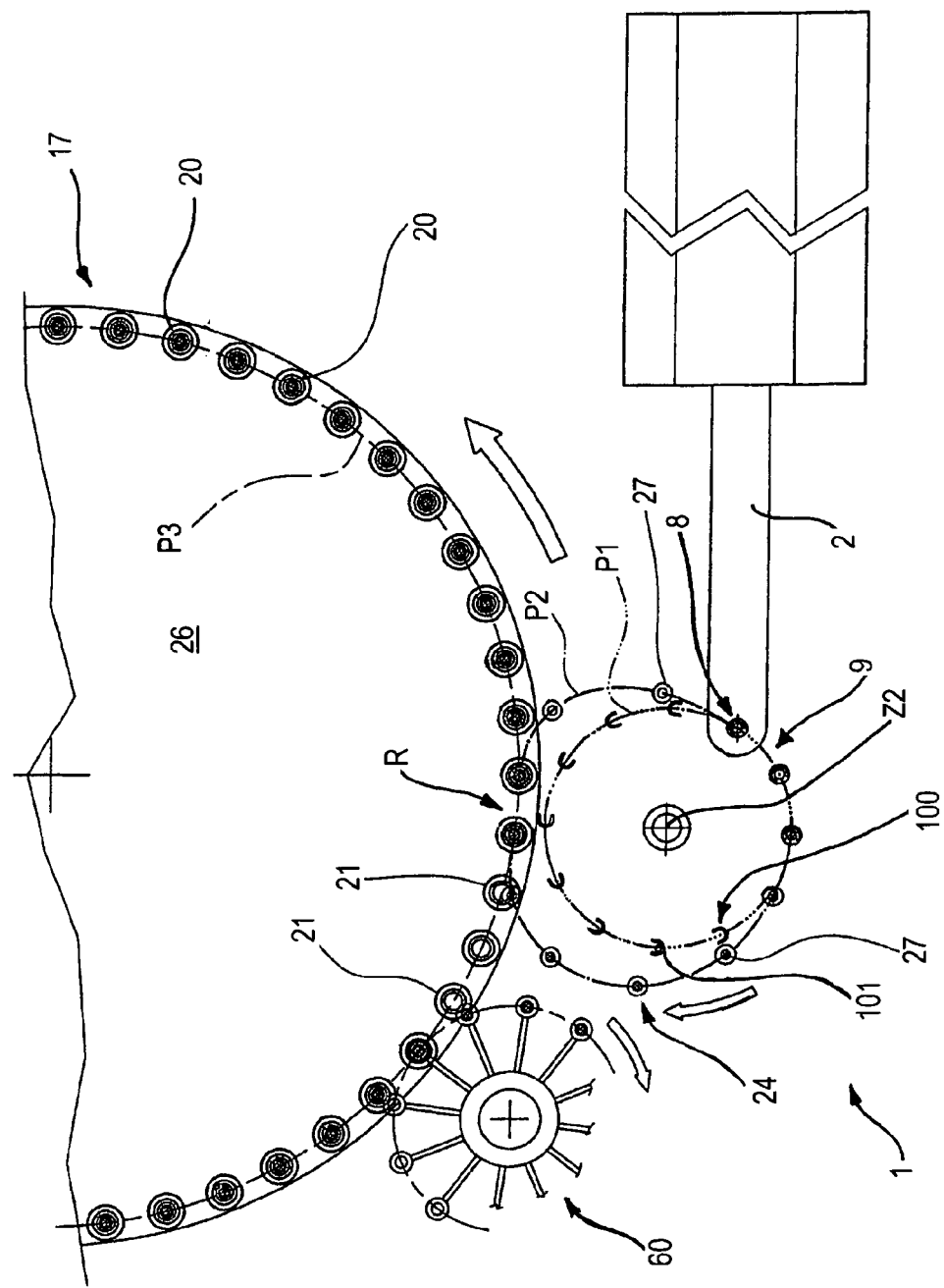
FIG. 2 is a plan view of the apparatus in FIG. 1.

With reference to FIGS. 1 and 2, there is shown an apparatus 1 for compression-moulding doses 50 of plastics so as to obtain objects, such as, for example, preforms for containers, particularly for bottles. The apparatus 1 comprises an extruding device 2 provided with a dispensing opening 8 through which the plastics are extruded along an exit axis A arranged in an exit direction Z1.

The apparatus 1 furthermore comprises a cutting arrangement 3 that cuts the plastics exiting from the extruding device 2 to separate the doses 50 therefrom.

Below the cutting arrangement 3 a transferring arrangement 9 is provided for transferring the doses 50 cut by the cutting arrangement 3 to a forming arrangement 17 comprising a plurality of moulds 20 mounted in a peripheral region of a moulding carousel 26. Each mould 20 comprises a die 21 and a punch that is not shown, which are movable with respect to one another between an open position in which a dose 50 can be inserted inside the die 21, and a closed position in which the dose 50 is shaped so as to obtain a preform. The latter is extracted from the mould 20 by means of an extracting device 60.

The transferring arrangement 9 comprises a first transferring arrangement 100 comprising a first carousel 23 that is rotatable around a rotation axis Z2. In a peripheral region of the first carousel 23 a plurality of first transferring elements 101 is mounted, each one of which has a cross section having a "C"-like shape and is provided with a concavity in which a dose 50 can be received. Below this concavity a funnel element is provided that is not shown, through which the dose 50 can be transferred to a second transferring arrangement 24 of the transferring arrangement 9.

The second transferring arrangement 24 comprises a plurality of second transferring elements 27, each of which has the shape of a hollow cylinder. Each transferring element 27 is provided with a lower end that can be shut or opened through closing devices that are not shown.

The first transferring elements 101 are movable along a substantially circular first path P1, along which each first transferring element 101 receives the dose 50 cut by the cutting arrangement 3 in a removing position Q shown in FIG. 1. Whilst the first transferring element 101 moves along the first path P1, the dose 50 descends by gravity along the walls of the first transferring element 101 and, after passing through the corresponding funnel element, is delivered to a second transferring element 27.

The second transferring elements 27 are movable along a second path P2 that is at a lower level than the first path P1. Whilst it moves along the second path P2, each second transferring element 27 receives the dose 50 from a first transferring element 101 that is above and, in a delivering position R, releases the dose 50 inside an underlying die 21. The latter moves along a substantially circular third path P3 arranged at a lower level than the second path P2.

As shown in FIG. 1, the cutting arrangement 3 is provided with a knife 22 comprising a blade 4 supported by a supporting element 5. The blade 4 has a substantially flat geometry and is provided with a cutting edge 53, having a substantially rectilinear shape, which lies on the plane defined by the blade 4. The knife 22 is rotated through a driving arrangement 7 in such a way as to pass periodically below the extrusion opening 8 to cut the plastics exiting from the extruding device 2.

FIGS. 3 and 4 show an alternative embodiment of the apparatus 1, in which the knife 22 is moved in a rectilinear manner instead of being rotated as shown in FIG. 1. The plastics are dispensed by the extruding device 2 in a continuous manner and move along the exit axis A in the exit direction Z1 at a substantially constant exit speed V. The blade 4 moves along a rectilinear trajectory T that is contained on a plane that is oblique with respect to the exit axis A. In other words, the blade 4 has a motion component that is parallel to the exit direction Z1 and a further motion component that is perpendicular to the exit direction Z1. The motion component that is parallel to the exit direction Z1 is directed from the dispensing opening 8 to the first transferring arrangement 100.

FIG. 3 shows the knife 22 in an initial cutting step, in which the blade 4 has reached the plastics and starts to separate the dose 50 from an initial portion Q1 of plastics.

Whilst the blade 4 continues to cut the plastics, the initial portion Q1 moves along the exit direction Z1 moving away from the dispensing opening 8. Also the blade 4, by moving along the trajectory T, moves away from the dispensing opening 8 so that, in a final cutting step shown in FIG. 4, the blade 4 separates the dose 50 from a final portion Q2 of the plastics that is roughly at the same level as the initial portion Q1, in a position diametrically opposite the initial portion Q1. In this way it is possible to obtain doses 50 of plastics that are delimited by a side surface 28 and by two end surfaces 29, in which the end surfaces 29 are substantially orthogonal to the side surface 28.

The blade 4 moves at a speed W having a cutting component W1 that is perpendicular to the exit direction Z1 and a pursuing component W2 that is parallel to the exit direction Z1. The cutting component W1 enables the blade 4 to separate the dose 50 from the plastics exiting from the dispensing opening 8, whilst the pursuing component W2 enables the blade 4 to move in the same direction as the plastics during cutting. The pursuing component W2 can be greater than, or the same as, the exit speed V of the plastics from the extruding device 2. If the pursuing component W2 is greater than the exit speed V of the plastics, the blade 4 tends to tear the dose 50 from the plastics exiting from the dispensing opening 8, which makes it easier to separate the doses 50 from the plastics.

The contact between the cutting arrangement 3 and the plastics is also minimised, because if the pursuing component W2 is greater than the exit speed V, the plastics come into contact substantially only with the cutting edge 53 of the blade 4. This enables the thrust to be reduced that the plastics exiting from the dispensing opening 8 exert on the blade 4. In other words, the initial portion Q1 substantially does not push down the blade 4, because the blade 4 moves away from the dispensing opening 8 together with, or even a little faster than, the initial portion Q1. Deformations of the blade 4 are thus avoided that are due to the thrust exerted by the plastics exiting from the dispensing opening 8, which enables good cutting precision to be maintained. Furthermore, it is more difficult for the plastics exiting the dispensing opening 8 to adhere to the blade 4. Lastly, cooling of the plastics in contact with the blade 4 is less.

FIG. 5 shows an embodiment of the apparatus 1 in which the cutting arrangement 3 is rotated by the driving arrangement 7, as already disclosed with reference to FIG. 1, and move away from the dispensing opening 8 during cutting. The driving arrangement 7 comprises an electric motor 31, provided with a motor shaft 32 that extends along a longitudinal axis L. The electric motor 31 is fixed to a flange 33 by means of a clamp 34 clamped on the motor shaft 32. The flange 33 is in turn fixed, through fixing devices that are not shown, to a supporting bracket 35 mounted on a frame 36 of the apparatus 1. Between the flange 33 and the supporting bracket 35 there is interposed a spacer 37, delimited by a first face 38 facing the flange 33 and by a second face 39 facing the supporting bracket 35. As the first face 38 and the second face 39 are not parallel to one another, the flange 33, which is substantially perpendicular to the motor shaft 32, can be tilted with respect to the supporting bracket 35. The latter defines a resting plane for the spacer 37 that is substantially perpendicular to the exit axis A. The spacer 37 thus enables the longitudinal axis L of the motor shaft 32 to be tilted with respect to the exit axis A along which the plastics exiting from the extruding device 2 move.

On the motor shaft 32 there is mounted the knife 22 by means of a further spacer 40 interposed between a first plate 43 and a second plate 44. The first plate 43 is fixed to the motor shaft 32 so as to be substantially perpendicular to the longitudinal axis L. The second plate 44 is fixed to the supporting element 5 of the knife 22 and is substantially parallel to a plane defined by the blade 4. The further spacer 40 is delimited by a first surface 45, which is in contact with the first plate 43, and by a second surface 46, which is in contact with the second plate 44. The first surface 45 and the second surface 46 are tilted with respect to one another. Thus the further spacer 40 enables the knife 22 to be mounted on the motor shaft 32 in such a way that an axis H, which is perpendicular to the plane defined by the blade 4, is not parallel to the longitudinal axis L of the motor shaft 32. In other words, owing to the further spacer 40 the blade 4 lies on a plane that is oblique with respect to the longitudinal axis L.

Figure 6:
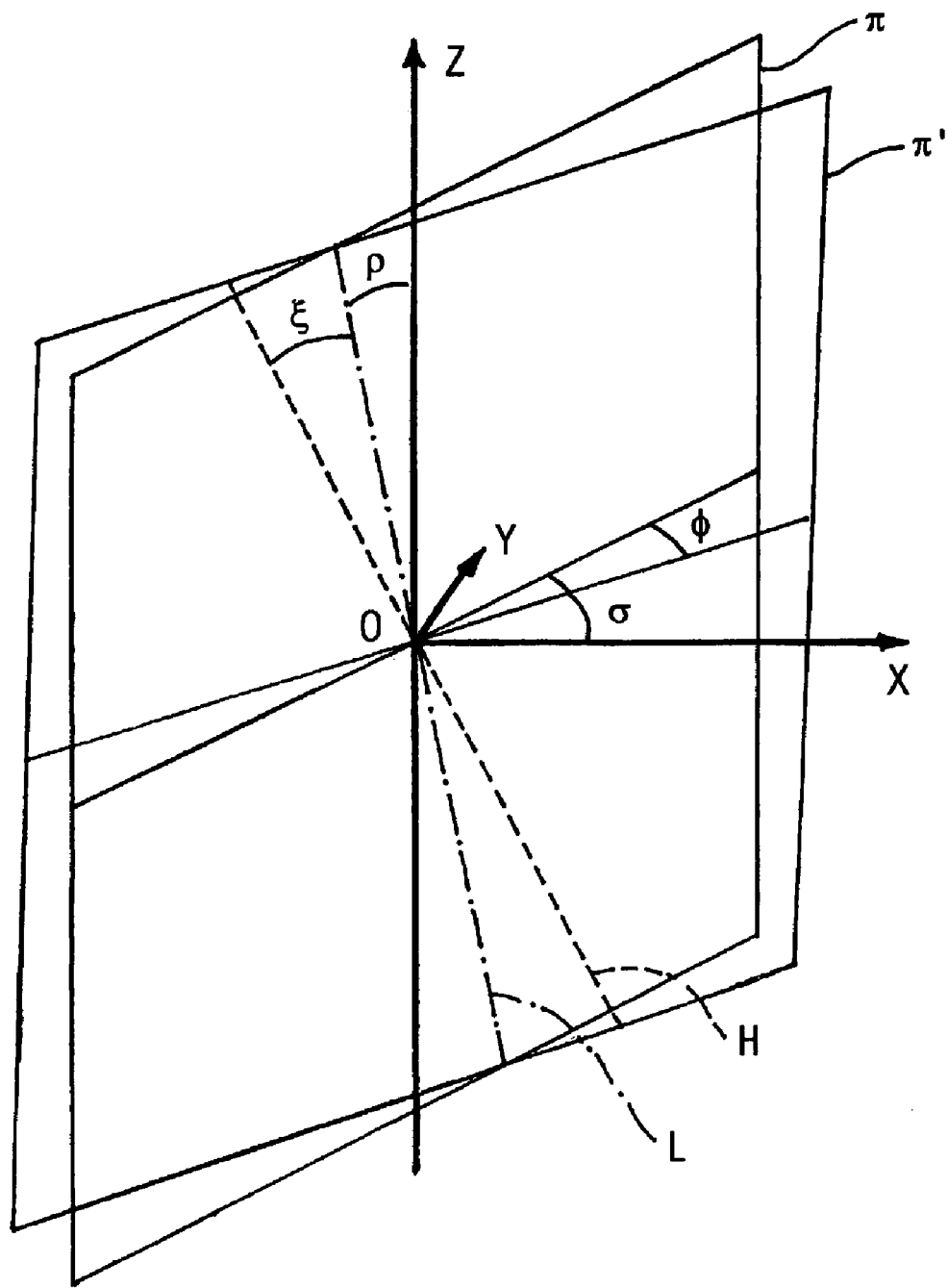
FIG. 6 is a schematic view showing the geometrical arrangement of the cutting arrangement in FIG. 5.

The arrangement of the longitudinal axis L, of the axis H and of the exit axis A shown in FIG. 5 can be better understood by examining the FIG. 6. In the FIG. 6, there has been defined a Cartesian reference system XYZ in which the plane XY coincides with the plane defined by the blade 4 in the theoretical case in which the blade 4 lies on a plane that is perpendicular to the exit direction Z1 and rotates maintaining itself on this plane. The plane XZ contains the exit axis A and the longitudinal axis of the motor shaft in the theoretical case in which the blade 4 lies on a plane that is perpendicular to the exit direction Z1 and rotates by maintaining itself on this plane. The Cartesian axis Z is thus parallel to the exit axis A along which the plastics exiting from the extruding device 2 move. The origin O of the Cartesian reference system XYZ was selected as an intersecting point between the longitudinal axis of the motor shaft and the plane on which the blade 4 lies, in the theoretical case in which the blade 4 lies on a plane perpendicular to the exit direction Z1 and rotates by maintaining itself on this plane. To obtain the situation shown in FIG. 5, it is assumed that the longitudinal axis L of the motor shaft 32 and the axis H rotate around the origin O. The axis H shown in FIG. 6 is therefore the axis passing through the origin O and orthogonal to the plane on which the blade 4 lies in the configuration shown in FIG. 5.

It should be noted that the longitudinal axis L and the axis H intersect, despite not being parallel to one another. The exit axis A is on the other hand skew with respect to the longitudinal axis L and to the axis H.

It is possible to define a plane π, which contains the Cartesian axis Z and the longitudinal axis L. The plane it forms a first angle σ with the Cartesian plane XZ, whilst the longitudinal axis L of the motor shaft 32 forms, on the plane π, a second angle ρ with the Cartesian axis Z. The first angle σ and the second angle ρ enable the position of the longitudinal axis L in the Cartesian reference system XYZ to be defined completely.

It is furthermore possible to define a further plane π', which contains the longitudinal axis L and the axis H. The plane π and the further plane π' intersect along the longitudinal axis L. The further plane π' is obtained by rotating the plane π by a third angle φ around the longitudinal axis L. On the further plane π', the axis H that is perpendicular to the plane defined by the blade 4 forms a fourth angle ξ with the longitudinal axis L of the motor shaft 32. The third angle φ and the fourth angle ξ enable the position of the axis H to be defined completely with respect to the longitudinal axis L.

During operation, the electric motor 31 rotates the knife 22 around the longitudinal axis L, so that the blade 4 moves along a closed-loop path and interferes periodically with the plastics exiting from the extruding device 2. The arrangement of axes shown in FIGS. 5 and 6 ensures that the blade 4, when interacting with the plastics, has a motion component directed along the exit direction Z1 and a further motion component that is perpendicular to the exit direction Z1. In this way the blade 4, whilst cutting the plastics, moves away from the dispensing opening 8 and accompanies the dose 50 that moves along the exit direction Z1. This enables more precise doses to be obtained and a cleaner cut to be obtained, as disclosed previously with reference to FIGS. 3 and 4.

By adopting the arrangement of axes shown in FIG. 6, it is also possible to rotate the blade 4 in such a way that, whilst a dose 50 is cut, a portion of the cutting edge 53 that interacts with the plastics has a speed component along the exit direction Z1 that is equal to or greater than the exit speed V of the flowable material from the extruding device 2.

Furthermore, it is possible to ensure that a region of the blade 4 that interacts with the plastics after the cutting edge 53 has a speed component along the exit direction Z1 that is the same as or greater than the exit speed V with which the flowable material exits from the extruding device 2. In this way the region of the blade 4 that interacts last with the plastics is prevented from pushing the plastics exiting from the extruding device 2 to the dispensing opening 8. By suitably choosing the values of the angles σ, ρ, φ, and ξ it is possible to minimise the contact between the blade 4 and the plastics when a dose 50 is cut and in particular ensure that the blade 4 contacts the plastics substantially only along the cutting edge 53. This enables the advantages previously disclosed with reference to FIGS. 3 and 4 to be obtained.

The electric motor 31 can be controlled by electronic speed-varying devices that enable the speed W' of the cutting arrangement 3, and more in particular of the knife 22, to be varied along the path thereof around the longitudinal axis L. In particular, the electric motor 31 can be a servomotor, i.e. a motor linked, for example, to a further motor that drives the moulding carousel 26 or the second transferring arrangement 24.

Figure 7:
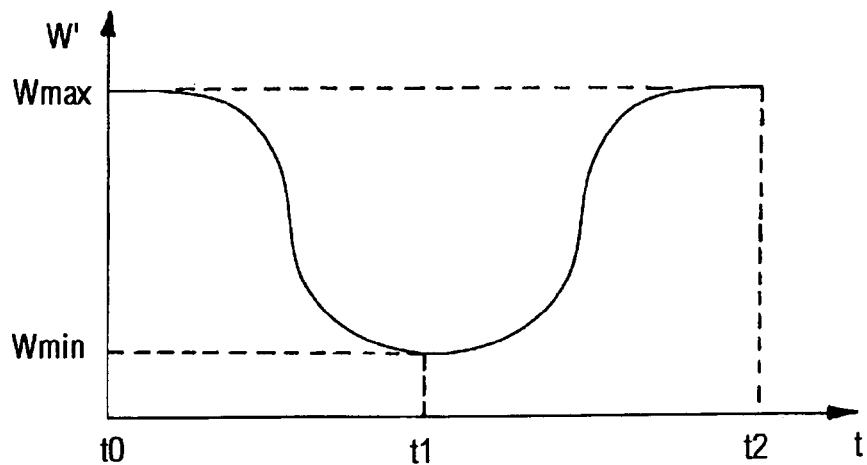
FIG. 7 is a graph that shows schematically how the speed of the cutting arrangement in FIG. 5 varies, in a first embodiment.

FIG. 7 is a graph that shows schematically how the speed W' varies in function of the time t. At an initial instant to, in which the knife 22 separates the dose 50 from the plastics exiting from the extruding device 2, the speed W' is the same as a maximum value Wmax. Subsequently, the electronic speed-varying devices slow down the knife 22, the speed of which W' reaches a minimum value Wmin in an intermediate instant t1. After the intermediate instant t1, the speed W' increases until maximum value Wmax is reached again at the final instant t2, immediately before starting to cut a new dose 50 of plastics.

Owing to the electronic speed-varying devices, it is possible to easily modify the maximum value and the minimum value of the speed W', depending on needs. In particular, the value of the speed W' that the cutting arrangement 3 has when it cuts the dose 50 can be selected in function of the type of plastics constituting the dose 50 and of the temperature thereof. Furthermore, by modifying the speed W' of the cutting arrangement 3 it is possible to vary the period of time that elapses between the cutting of two subsequent doses, i.e. to modify the length of the dose 50. It should be noted that the electronic speed-varying devices enable the speed W' of the cutting arrangement 3 to be varied in a very rapid and simple manner without the need to replace mechanical parts.

Furthermore, owing to the electronic speed-varying devices, the speed W' of the cutting arrangement 3 can be made non-positive, i.e. it may assume nil values or values that are less than zero. On the other hand, by using the elliptical toothed wheels disclosed in U.S. Pat. No. 4,640,673 the speed of the knives was able to assume only positive values.

Figure 8:
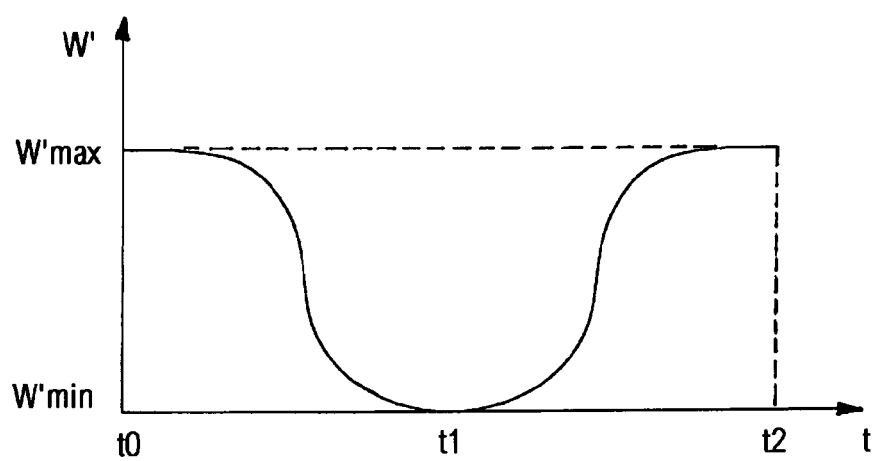
FIG. 8 is a graph that shows schematically how the speed of the cutting arrangement in FIG. 5 varies, in a second embodiment.

In particular, in the embodiment shown in FIG. 8, the speed W' of the knife has a minimum value W'min that is equal to zero. This means that the knife 22, after cutting the dose 50 by moving at a maximum speed W'max, is slowed down until it stops. After stopping, the knife 22 is accelerated until the speed thereof again reaches the maximum value W'max at the final instant t2, in which a new dose 50 can be cut.

Figure 9:
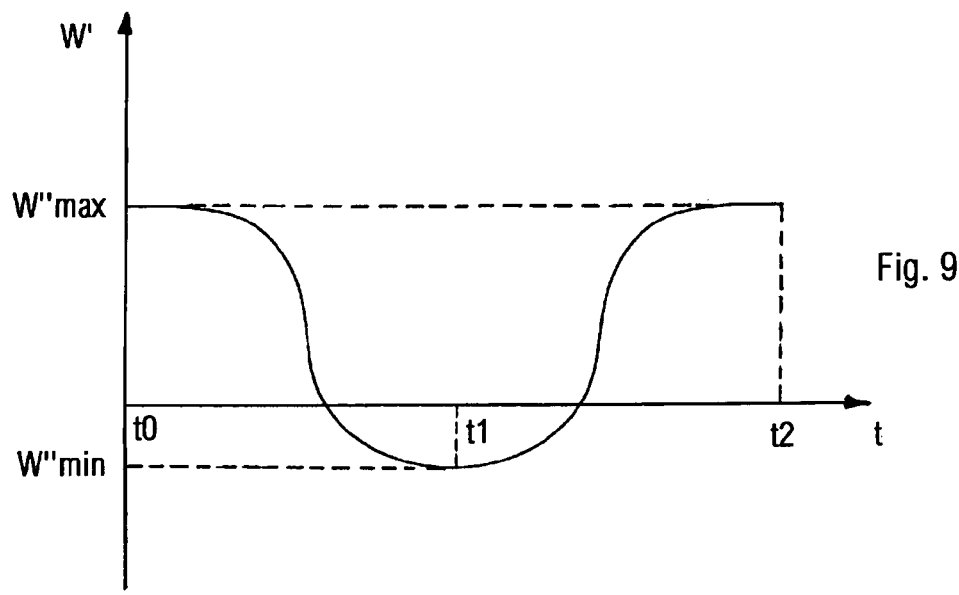
FIG. 9 is a graph that shows schematically how the speed of the cutting arrangement in FIG. 5 varies, in a third embodiment.

In a further embodiment, shown in FIG. 9, the speed W' of the knife 22 is variable between a maximum value W"max that is greater than zero and a minimum value W"min that is less than zero. In this case, the knife 22, after cutting the dose by moving at the maximum speed W"max, is slowed down until it stops and is then moved back along the path thereof. After the speed thereof has reached the minimum value W"min, the knife 22 is accelerated until the maximum speed W"max that it reaches immediately before cutting a new dose 50.

By using a knife 22 that moves at a speed of the type shown in FIGS. 7 to 9, it is possible to cut the plastics in a clean manner and obtain doses that are free of burrs. In fact, when the knife 22 cuts the plastics, it moves in a fast manner, which enables a clean cut to be obtained. After cutting the plastics, the knife 22 slows down, which enables the knife 22 to "waste time", so to speak, whilst a quantity of plastics that is sufficient to form a dose 50 exits from the extruding device 2. This effect is particularly accentuated if the knife 22 is stopped between the cutting of a dose and the cutting of the subsequent dose, as shown in FIG. 8, or is moved backwards, as shown in FIG. 9.

Furthermore, by moving the knife 22 backwards it is possible to increase the space along which the knife 22 can accelerate before cutting a new dose 50. In this way, when it interacts with the plastics exiting the extruding device 2, the knife 22 may have a very great acceleration, which enables it to cut the plastics in a clean and precise manner, without undesired tears or stretches.

Lastly, it should be noted that by using electronic speed-varying devices it is possible to move the knife 22 at a constant speed when cutting a dose 50.

The electronic speed-varying devices that enable the speed of the knife 22 to be varied as shown in FIGS. 7 to 9 can be used not only with a cutting arrangement 3 of the type shown in FIG. 5, but also with cutting arrangement that moves perpendicularly to the exit direction of the plastics from the extruding device 2. On the other hand, the cutting arrangement 3 shown in FIGS. 5 and 6 can also be moved at a constant speed.

Figure 10:
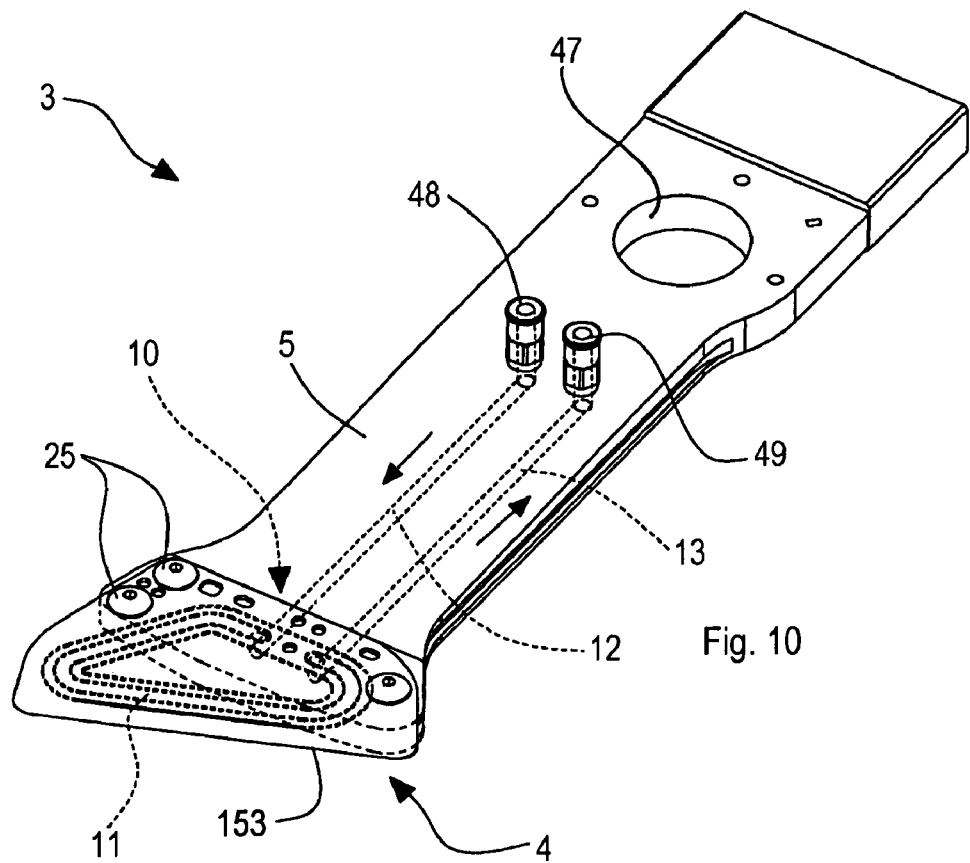
FIG. 10 is a perspective view showing a knife of the cutting arrangement in FIG. 5.

As shown in FIG. 10, the supporting element 5 may have an elongated flat shape and be provided with an end at which the blade 4 is removably fixed, for example through screws 25. At a further end of the supporting element 5, opposite the aforementioned end, there is obtained a fixing hole 47 through which the supporting element 5 can be fixed to the motor shaft 32.

The cutting arrangement 3 may be provided with a cooling circuit 10 in which a cooling fluid, for example water, may circulate. The cooling circuit 10 comprises a cooling conduit 11, made in the blade 4, a supply conduit 12 and a discharge conduit 13.

The supply conduit 12 and the discharge conduit 13 are connected together by means of the cooling conduit 11 and enable the cooling fluid respectively to reach, and to move away from, the blade 4. The supply conduit 12 is connected to an inlet of the cooling fluid by means of an inlet connector 48, whilst the discharge conduit 13 is connected to an outlet of the cooling fluid by means of an outlet connector 49.

Figures 11, 12:
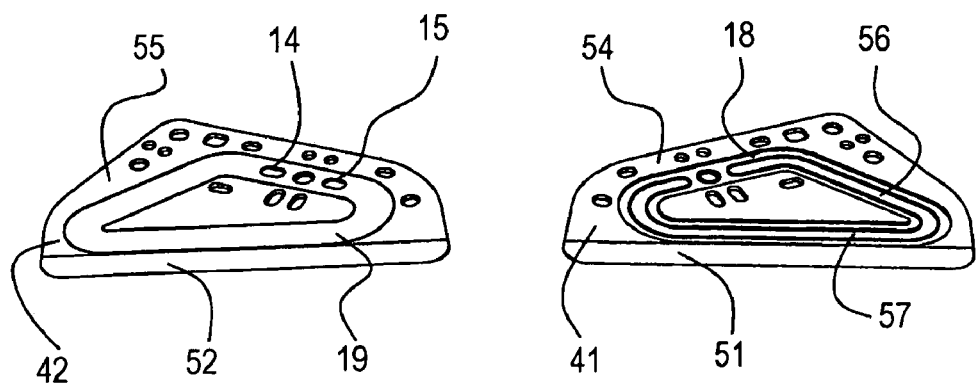
FIG. 11 is a perspective view that shows a first laminar part of the knife in FIG. 10.
FIG. 12 is a perspective view that shows a second laminar part of the knife in FIG. 10.

The blade 4 comprises a first laminar part 41 and a second laminar part 42, shown respectively in FIGS. 11 and 12. The first laminar part 41 and the second laminar part 42 have substantially the same plan shape and are provided respectively with a first internal face 54 and with a second internal face 55 that, in an assembled condition shown in FIG. 10, are arranged in contact together. The first laminar part 41 and the second laminar part 42 comprise respectively a first cutting portion 51 and a second cutting portion 52, which in the assembled condition define a cutting edge zone 153 that cuts the dose 50. On the first internal face 54 there is obtained an open channel 56, which is defined by a groove having a plan shape that is substantially like that of an open triangle. The open channel 56 is provided with a plurality of rectilinear portions comprising a cooling portion 57 that extends near to the first cutting portion 51 and is substantially parallel to the first cutting portion 51. In the assembled condition, the open channel 56 is closed by the second laminar part 42 in such a way as to form the cooling conduit 11.

In order to prevent leaks of cooling fluid, between the first laminar part 41 and the second laminar part 42 there can be interposed a seal 19, consisting for example of a flat element in elastomeric material, having a shape corresponding to the shape of the open channel 56. In this case, on the first laminar part 41 there can be obtained a seat 18 for housing the seal 19. The open channel 56 is made in the bottom of the seat 18. In the assembled condition of the cutting arrangement 3, the seal 19 is compressed between the first laminar part 41 and the second laminar part 42, preventing leaking of the cooling fluid.

The supply conduit 12 leads into the cooling conduit 11 through a first passage opening 14. Similarly, the discharge conduit 13 is connected to the cooling conduit 11 through a second passage opening 15. The first opening 14 and the second opening 15 are made in the second laminar part 42. In an embodiment that is not shown, the cooling conduit 11 can be made of two opposite open channels, which are obtained respectively in the first laminar part 41 and in the second laminar part 42.

The cooling circuit 10, through which the cooling fluid flows, enables the temperature of the cutting arrangement 3 to be diminished effectively, especially at the cutting edge zone 153 of the blade 4. In this way it is possible to significantly reduce the phenomena of adhesion of the plastics to the blade 4 during cutting, enabling the dose 50 to be cut in a precise and clean manner. Furthermore, the decrease of the temperature and of the phenomena of adhesion enables wear and deterioration of the cutting arrangement 3 to be limited, in particular of the first cutting portion 51 and of the second cutting portion 52.

In an embodiment that is not shown, the cutting arrangement 3 can be provided with a heating arrangement for heating the blade 4, particularly near the cutting edge zone 153. The heating arrangement can comprise a heating circuit, structurally similar to the circuit 10 shown in FIGS. 10 to 12, in which there circulates a heated fluid. Alternatively, the heating arrangement may comprise an electrical resistance or any other known type of heating device. The heating arrangement is such as to heat the blade 4 to a temperature that is greater than the melting temperature of the plastics exiting from the extruding device 2. In particular, if the heating arrangement heats the blade 4 to a temperature little greater than the aforementioned melting temperature, the plastics cut by the cutting arrangement 3 cannot solidify on contact with the blade 4 and deposit on the latter. In this way, residues of plastics are prevented from forming on the blade that could compromise cutting precision.

If on the other hand the heating arrangement heats the blade 4 to a temperature much greater than the melting temperature of the plastics, possible deposits of plastics that have accumulated on the blade 4 are thermally degraded and volatilised.

As shown in FIGS. 13 and 14, the apparatus 1 may comprise diverting devices 6 that are able to discard a possible defective dose 50' by diverting the latter from the exit direction Z1 along which the plastics exit from the extruding device 2.

The diverting devices 6 comprise one or more nozzles 16, which are positioned below the cutting arrangement 3 and are suitable for emitting jets 30 of pressurized fluid, typically compressed air, intended to hit the defective dose 50'. The jets 30 have a pressure that is able to develop a sufficient thrust to project the defective dose 50' far from the extruding device 2 and from the cutting arrangement 3, as well as from the transferring arrangement 9. For example, in the case of FIGS. 13 and 14 the defective dose 50' is projected outside the first carousel 23. The diverting devices 6 thus prevent the defective dose 50' from reaching the corresponding first transferring element 101 of the first transferring arrangement 100.

The diverting devices 6 can be used in the start-up steps of the apparatus 1 to discard possible defective doses 50' having a length in the exit direction Z1 that is less than a preset limit. Such doses are not correctly conveyable by the transferring arrangement 9. In fact, the aforementioned doses could arrange themselves transversely to the exit direction Z1 whilst they traverse the funnel elements of the first transferring arrangement 100. If this occurs, the defective doses 50' would occlude the funnel elements, making it necessary to arrest the apparatus 1 to remove them from the funnel elements.

Figure 15:
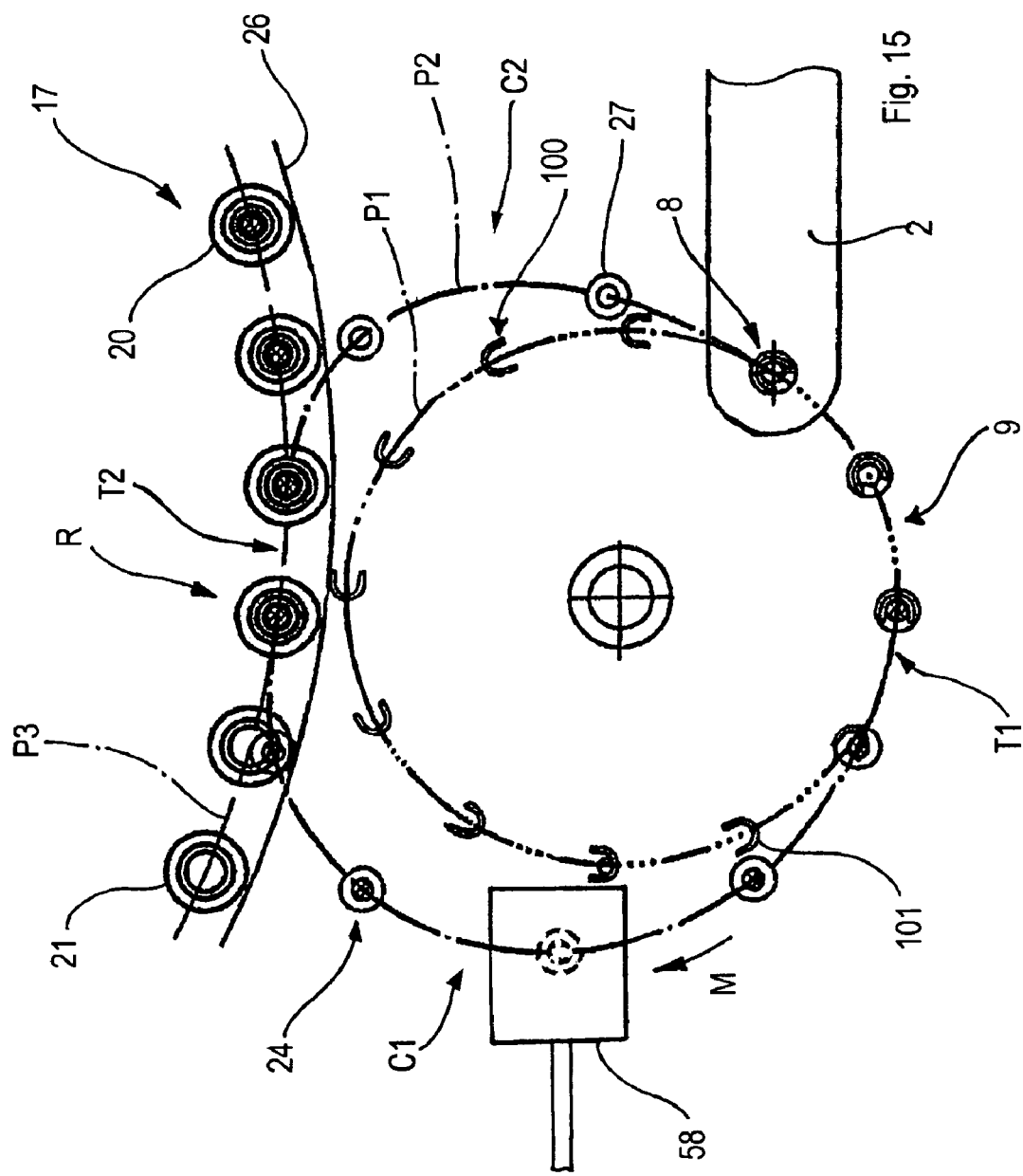
FIG. 15 is a plan view of a transferring arrangement of the apparatus in FIG. 1, associated with discarding devices.

FIG. 15 shows an embodiment of the apparatus 1 in which there is provided discarding devices 58 for discarding a possible defective dose whilst the latter is conveyed by the transferring arrangement 9, and in particular by the second transferring arrangement 24. The discarding devices 58 are activatable when it is detected that the extruding device 2 has dispensed a dose that, although having a sufficient length to make it conveyable by the transferring arrangement 9, is nevertheless not free of defects. The discarding devices 58 may comprise for example a pneumatic device, similar to the nozzles 16 disclosed with reference to FIGS. 13 and 14, which pushes the defective dose outside the discarding devices 58 and can expel the defective dose 50' through the lower end of the corresponding second transferring element 27, which the closing devices previously opened.

The discarding devices 58 are positioned upstream of the delivering position R with respect to a movement direction M of the second transferring arrangement 24. In this way, when the defective dose is discarded, the second transferring arrangement 24 has a relatively low acceleration, as will be explained better below.

In the second path P2 of the second transferring arrangement it is possible to define a portion T1 substantially coinciding with an arc of the first path P1 of the first transferring arrangement 100. Along the portion T1 each first transferring element 101 is substantially superimposed on a corresponding second transferring element 27, so that a relatively long period of time is available during which the dose 50 can pass from the first transferring element 101 to the second transferring element 27.

Similarly, it is possible to define a further portion T2 in which the second path P2 of the second transferring arrangement 24 and the third path P3 of the forming arrangement 17 are substantially coincident. In the further portion T2, the dose 50 has a relatively long period of time available for being transferred from the second transferring arrangement 24 to the forming arrangement 17.

In the portion T1, the speed of the second transferring arrangement 24 is substantially the same as the speed of the first transferring arrangement 100. Similarly, in the further portion T2 the speed of the second transferring arrangement 24 is substantially the same as the speed of the forming arrangement 17.

Between the portion T1 and the further portion T2 there is defined a departure curved portion C1 in which the acceleration of the second transferring arrangement 24 is maintained below a limit value to prevent excessive stress to the dose 50, which in this zone is contained inside a corresponding second transferring element 27. Between the further portion T2 and the portion T1 there is defined a return curved portion C2 in which the acceleration of the second transferring arrangement 24 is higher inasmuch as there exists no risk of damaging the doses 50, which have already been delivered to the forming arrangement 17. This furthermore enables the overall dimensions of the second transferring arrangement 24 to be kept limited in the return curved portion C2.

By positioning the discarding devices 58 between the portion T1 and the further portion T2, i.e. in the departure curved portion C1, the discarding of the defective doses is made easier. In fact, the discarding devices act in a zone of the second path P2 in which the acceleration of the second transferring arrangement 24 is kept at relatively low values. It is not therefore necessary to slow down the second transferring arrangement 24 in order to make the discarding possible.

In an embodiment that is not shown, in the departure curved portion C1 it is possible to define a portion in which the second transferring arrangement 24 has a constant speed and therefore zero acceleration. In this case, the discarding devices 58 are positioned in the constant speed portion, in which it is easier to discard a possible defective dose 50' as no inertia forces act thereupon.

In an embodiment, the apparatus 1 may comprise both the discarding devices 58 and the diverting devices 6. In this case, the diverting devices 6 are used to discard the defective doses 50' dispensed in the start-up steps of the apparatus 1. These doses may in fact be too short and therefore not be conveyable by the transferring arrangement 9. The discarding devices 58 are on the other hand used to discard possible defective doses that are produced when the apparatus 1 is running normally. These doses are usually of sufficient length to be conveyed by the transferring arrangement 9, whilst having defects that would not enable a preform of good quality to be obtained.

In an alternative embodiment, the apparatus 1 may comprise only the discarding devices 58 and be devoid of the diverting devices 6. This is possible, for example, when the extruding device 2 is provided with a positive displacement pump that pushes the plastics to the dispensing opening 8. The positive displacement pump in fact enables a substantially constant flow rate of plastics to be obtained, which makes the risk almost nil of obtaining doses that are so short as not to be conveyable by the transferring arrangement 9.

It has been seen experimentally that if the extruding device 2 is provided with a positive displacement pump, in the start-up steps of the apparatus 1 possible defects are concentrated in a preset number of initial doses dispensed through the dispensing opening 8, usually comprised between five and ten initial doses. It is thus possible to set up the discarding devices 58 in such a way as to automatically discard a fixed number of initial doses in the start-up steps of the apparatus 1. This enables complicated controls to be avoided that are intended to determine when the extruding device 2, during the start-up steps of the apparatus 1, starts to dispense doses of acceptable quality.

It is understood that the features disclosed in the description of the Figures with reference to a specific embodiment can be claimed also in relation to any other disclosed embodiment or also per se.

The invention claimed is:

1. Apparatus comprising:
   an extruding device having a dispensing opening for extruding a flowable material in an exit direction through said dispensing opening,
   a forming arrangement arranged for compression-moulding a dose of said flowable material,
   a transferring arrangement for transferring a dose of said flowable material to said forming arrangement,
   a cutting arrangement interposed between said extruding device and said transferring arrangement for separating said dose from said flowable material and
   a driving arrangement for rotating said cutting arrangement,
   said transferring arrangement being arranged for receiving said dose cut by said cutting arrangement in a removal position and delivering said dose to said forming arrangement in a delivery position, said transferring arrangement being rotatable around a rotation axis that is different from a rotation axis around which said cutting arrangement rotates,
   said cutting arrangement having a front cutting edge that is oblique with respect to said exit direction so that said cutting arrangement periodically passes between said extruding device and said transferring arrangement with a motion component that is parallel to said exit direction and a further motion component that is perpendicular to said exit direction, wherein said parallel motion component is directed in such a way as to move said cutting edge away from said dispensing opening whilst said dose is being separated from an initial cutting step to a final cutting step.

2. Apparatus according to claim 1, wherein said driving arrangement comprises a motor having a motor shaft extending along a longitudinal axis.

3. Apparatus according to claim 2, wherein said motor is an electric motor.

4. Apparatus according to claim 2, wherein said longitudinal axis is skew with respect to an exit axis along which said flowable material exits from said dispensing opening, said exit axis being parallel to said exit direction.

5. Apparatus according to claim 4, wherein said exit axis is vertical.

6. Apparatus according to claim 4, and further comprising a spacing element interposed between a flange of said driving arrangement and a supporting element for fixing said driving arrangement to a frame of said apparatus.

7. Apparatus according to claim 6, wherein said spacing element is delimited by a first face that is in contact with said flange and by a second face that is in contact with said supporting element, said first face being tilted with respect to said second face.

8. Apparatus according to claim 6, wherein said flange is substantially perpendicular to said longitudinal axis and said supporting element defines a supporting plane for said spacing element, said supporting plane being substantially perpendicular to said exit axis.

9. Apparatus according to claim 2, wherein said cutting arrangement comprises a cutting element that lies on an oblique plane with respect to said longitudinal axis.

10. Apparatus according to claim 9, wherein said cutting edge is made in said cutting element and is lying on said oblique plane.

11. Apparatus according to claim 9, wherein said longitudinal axis is skew with respect to an exit axis along which said flowable material exits from said dispensing opening, said exit axis being parallel to said exit direction and said oblique plane is perpendicular to an axis that intersects said longitudinal axis at a point of said oblique plane, said axis being skew with respect to said exit axis.

12. Apparatus according to claim 2, and further comprising a separating element interposed between a first plate fixed with respect to said motor shaft and a second plate fixed with respect to said cutting arrangement.

13. Apparatus according to claim 12, wherein said separating element is delimited by a first surface that is in contact with said first plate and by a second surface that is in contact with said second plate, said first surface being tilted with respect to said second surface.

14. Apparatus according to claim 1, wherein said driving arrangement comprises electronic speed-varying devices for modifying a rotation speed of said cutting arrangement.

15. Apparatus according to claim 14, wherein said electronic speed-varying devices are configured in such a way as to vary said rotation speed between a minimum value and a maximum value.

16. Apparatus according to claim 15, wherein said minimum value is nil.

17. Apparatus according to claim 15, wherein said minimum value is negative.

18. Apparatus according to claim 1, and further comprising a cooling circuit for cooling said cutting arrangement.

19. Apparatus according to claim 18, wherein said cutting arrangement comprises a first lamina-shaped part and a second lamina-shaped part between which there is defined a conduit of said cooling circuit.

20. Apparatus according to claim 19, wherein on said first lamina-shaped part there is obtained an open channel suitable for being closed by said second lamina-shaped part to define said conduit.

21. Apparatus according to claim 19, wherein said conduit substantially has an open-triangle plan shape.

22. Apparatus according to claim 19, wherein said conduit comprises a cooling portion that is arranged near to a cutting edge zone of said cutting arrangement.

23. Apparatus according to claim 22, wherein said cooling portion is substantially parallel to said cutting edge zone.

24. Apparatus according to claim 19, wherein said first lamina-shaped part and said second lamina-shaped part form, in an assembled condition, a blade of said cutting arrangement, said blade being removably fixed to a supporting element.

25. Apparatus according to claim 19, wherein said cooling circuit comprises a supply conduit and a discharge conduit by means of which a cooling fluid can respectively enter, and exit from, said conduit.

26. Apparatus according to claim 25, wherein said first lamina-shaped part and said second lamina-shaped part form, in an assembled condition, a blade of said cutting arrangement, said blade being removably fixed to a supporting element and said supply conduit and said discharge conduit are made in said supporting element.

27. Apparatus according to claim 25, wherein said second lamina-shaped part has a first opening through which said supply conduit leads into said conduit.

28. Apparatus according to claim 27, wherein said second lamina-shaped part has a second opening through which said discharge conduit is in fluid communication with said conduit.

29. Apparatus according to claim 1, wherein said cutting arrangement is provided with a heating arrangement for heating an operating surface of said cutting arrangement, said operating surface being suitable for interacting with said flowable material.

30. Apparatus according to claim 29, wherein said heating arrangement comprises a circuit in which a heated fluid can circulate.

31. Apparatus according to claim 29, wherein said heating arrangement comprises an electrical resistance device.

32. Apparatus according to claim 1, and further comprising discarding devices for discarding a defective dose.

33. Apparatus according to claim 32, wherein said discarding devices comprise diverting devices for diverting said defective dose from said exit direction.

34. Apparatus according to claim 33, wherein said diverting devices comprise at least one nozzle for emitting a jet of pressurised fluid that hits said defective dose.

35. Apparatus according to claim 34, wherein said at least one nozzle comprises at least one pneumatic nozzle for emitting compressed air.

36. Apparatus according to claim 32, wherein said discarding devices comprise diverting devices for diverting said defective dose from said exit direction and said diverting devices are interposed between said cutting arrangement and said transferring arrangement to prevent said defective dose from reaching said transferring arrangement.

37. Apparatus according to claim 1, and further comprising discarding devices for discarding a defective dose wherein said discarding devices are arranged upstream of said delivery position to remove said defective dose from said transferring arrangement.

38. Apparatus according to claim 1, wherein said transferring arrangement comprises a first transferring arrangement for receiving said dose in said removal position and a second transferring arrangement for receiving said dose from said first transferring arrangement and delivering it to said forming means.

39. Apparatus according to claim 38, and further comprising discarding devices for discarding a defective dose said discarding devices being positioned along a path of said second transferring arrangement to expel said defective dose from said second transferring arrangement upstream of said delivery position.

40. Apparatus according to claim 1, wherein said forming arrangement comprises a plurality of moulds mounted in a peripheral region of a rotatable carousel.

41. Apparatus according to claim 1, wherein said forming arrangement comprises a die device interacting with a punch device to form a container preform from said dose.

42. Apparatus according to claim 1, wherein said cutting arrangement comprises a single knife.

\* \* \* \* \*